United States Patent
Yu et al.

(10) Patent No.: US 11,505,113 B2
(45) Date of Patent: Nov. 22, 2022

(54) INTEGRATED MODULE INCLUDING CAMERA AND LAMP OF VEHICLE

(71) Applicant: HYUNDAI MOBIS CO., LTD., Seoul (KR)

(72) Inventors: Han Seong Yu, Yongin-si (KR); Jung Sub Lim, Yongin-si (KR); Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/355,139

(22) Filed: Jun. 22, 2021

(65) Prior Publication Data

US 2022/0001792 A1   Jan. 6, 2022

(30) Foreign Application Priority Data

Jul. 1, 2020 (KR) .................. 10-2020-0081143

(51) Int. Cl.
| | |
|---|---|
| *B60Q 1/14* | (2006.01) |
| *F21S 43/14* | (2018.01) |
| *G06V 20/56* | (2022.01) |
| *B60Q 1/00* | (2006.01) |
| *B60Q 1/18* | (2006.01) |

(Continued)

(52) U.S. Cl.
CPC .......... *B60Q 1/143* (2013.01); *B60Q 1/0023* (2013.01); *B60Q 1/0088* (2013.01); *B60Q 1/18* (2013.01); *B60Q 1/2607* (2013.01); *B60Q 1/2696* (2013.01); *B60Q 1/30* (2013.01); *B60R 11/04* (2013.01); *F21S 43/14* (2018.01); *F21V 23/0442* (2013.01); *G06V 20/56* (2022.01); *F21W 2103/55* (2018.01); *F21Y 2115/10* (2016.08)

(58) Field of Classification Search
CPC .... B60Q 1/143; B60Q 1/0023; B60Q 1/0088; B60Q 1/18; B60Q 1/2607; B60Q 1/2696; B60Q 1/30; F21S 43/14; G06V 20/56; F21V 23/0442
See application file for complete search history.

(56) References Cited

U.S. PATENT DOCUMENTS

| | | | |
|---|---|---|---|
| 6,509,832 B1 | 1/2003 | Bauer et al. | |
| 7,579,593 B2 * | 8/2009 | Onozawa | G01S 17/89 250/332 |

(Continued)

FOREIGN PATENT DOCUMENTS

JP   2011109634 A   6/2011

OTHER PUBLICATIONS

Office Action issued in the corresponding German Patent Application No. 102021116783.3 dated Oct. 13, 2021.

*Primary Examiner* — Bryon T Gyllstrom
(74) *Attorney, Agent, or Firm* — NovoTechIP International PLLC (57) ABSTRACT

The present disclosure relates an integrated module including a camera and a lamp, and may include a camera that acquires an image of a periphery of a vehicle and provide the image, at least one first lamp and at least one second lamp disposed at at least one location of an upper side and a lower side of the camera in a direction of a transverse axis of the camera, and a lamp controller that provides electrical energy for the first lamp to the first lamp and provides electrical energy for the second lamp to the second lamp according to daytime/nighttime determination information based on the image.

10 Claims, 5 Drawing Sheets

(51) Int. Cl.
*B60Q 1/26* (2006.01)
*B60Q 1/30* (2006.01)
*B60R 11/04* (2006.01)
*F21V 23/04* (2006.01)
*F21Y 115/10* (2016.01)
*F21W 103/55* (2018.01)

(56) References Cited

U.S. PATENT DOCUMENTS

| | | | |
|---|---|---|---|
| 9,066,393 B2* | 6/2015 | Recker | H05B 45/385 |
| 10,034,359 B2* | 7/2018 | Recker | H05B 47/115 |
| 2006/0177098 A1* | 8/2006 | Stam | B60Q 1/1423 |
| | | | 382/104 |
| 2007/0013779 A1 | 1/2007 | Gin et al. | |
| 2007/0221822 A1 | 9/2007 | Stein et al. | |
| 2008/0294315 A1* | 11/2008 | Breed | B60N 2/002 |
| | | | 701/49 |
| 2009/0010494 A1* | 1/2009 | Bechtel | B60R 1/00 |
| | | | 382/104 |
| 2010/0141153 A1* | 6/2010 | Recker | H05B 45/357 |
| | | | 315/149 |
| 2014/0029008 A1* | 1/2014 | Hirai | B60S 1/0844 |
| | | | 356/445 |
| 2015/0151671 A1* | 6/2015 | Refior | H05B 45/10 |
| | | | 315/297 |
| 2015/0332441 A1* | 11/2015 | Högasten | G06K 9/0051 |
| | | | 348/148 |
| 2016/0350601 A1* | 12/2016 | Grauer | G06V 10/751 |
| 2018/0079359 A1* | 3/2018 | Park | B60W 30/08 |
| 2020/0101906 A1* | 4/2020 | Kobayashi | G06V 20/588 |

* cited by examiner

INTEGRATED MODULE INCLUDING CAMERA AND LAMP OF VEHICLE

CROSS-REFERENCE TO RELATED APPLICATION

This application claims the benefit of priority to Korean Patent Application No. 10-2020-0081143, filed in the Korean Intellectual Property Office on Jul. 1, 2020, the entire contents of which are incorporated herein by reference.

TECHNICAL FIELD

The present disclosure relates an integrated module including a camera and a lamp.

BACKGROUND

In general, a camera is a configuration for acquiring an image of a periphery of a vehicle, and one or more cameras are installed on a front side, a rear side, a left side surface, and a right side surface of the vehicle.

The camera is an important device for detecting objects around a vehicle in an autonomous driving or advanced driver assistance system (ADAS).

However, an image provided by the camera is significantly influenced by an external environment.

In particular, the difference between the reliabilities of the images of the camera, which are captured during daytime and during nighttime is large, and many studies have been continued to increase the reliabilities of the images acquired during nighttime.

SUMMARY

The present disclosure has been made to solve the above-mentioned problems occurring in the prior art while advantages achieved by the prior art are maintained intact.

An aspect of the present disclosure provides an integrated module, in which a camera is disposed in the module including a lamp and an infrared ray lamp is disposed close to a location, at which the camera is disposed.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an integrated module includes a camera that acquires an image of a periphery of a vehicle and provides the image, at least one first lamp and at least one second lamp disposed at at least one location of an upper side and a lower side of the camera in a direction of a transverse axis of the camera, and a lamp controller that provides electrical energy for the first lamp to the first lamp and provides electrical energy for the second lamp to the second lamp according to daytime/nighttime determination information based on the image.

According to an aspect of the present disclosure, an integrated module includes a camera that acquires an image of a periphery of a vehicle and provides the image, a plurality of near-infrared ray lamps disposed close to the camera in a direction of a transverse axis of the camera, an image recognizer that determines whether driving of the vehicle is daytime driving or nighttime driving based on the image, and outputs the determination result as daytime/nighttime determination information, and a lamp controller that supplies electrical energy to the near-infrared ray lamps or stops supplying the electrical energy to the near-infrared ray lamps based on the daytime/nighttime determination information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 5.

Figure 1:
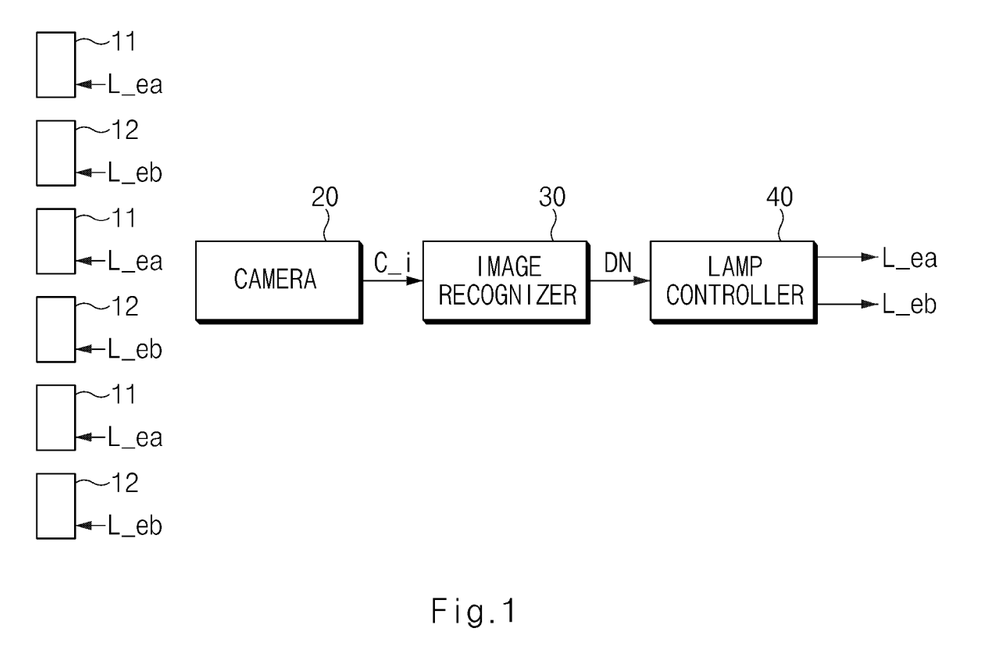
FIG. 1 is a view illustrating a configuration of an integrated module including a camera and a lamp of a vehicle according to an embodiment of the present disclosure.

FIG. 1 is a view illustrating a configuration of a system, for example, an integrated module or the like, including a camera and a lamp of a vehicle according to an embodiment of the present disclosure.

Referring to FIG. 1, a plurality of first lamps 11, a plurality of second lamps 12, a camera 20, an image recognizer 30, and a lamp controller 40 according to an embodiment of the present disclosure may be implemented in an interior of a vehicle. Then, the image recognizer 30 and the lamp controller 40 may be integrally formed with control units in the interior of the vehicle, and may be embodied as a separate apparatus to be connected to the control units of the vehicle by a separate connection unit.

The plurality of first lamps 11 may include daytime running lamps (DRLs) or rear combination lamps (RCLs) used as auxiliary light sources of the vehicle.

Then, the DRLs are called as daytime driving lamps, usually include LED lamps, and may be turned on, on a front side of the vehicle, such that a driver of another vehicle or a pedestrian may easily recognize the vehicle during daytime driving of the vehicle.

The RCLs generally refer to lamps applied to a rear side of the vehicle, and may be turned on to indicate a location, a stop state, a startup state, and change of lanes to a driver of a rear vehicle.

The plurality of first lamps 11 may be supplied with electrical energy L_ea for the first lamp and may be turned on. Then, when the plurality of first lamps 11 are not supplied with the electrical energy L_ea for the first lamp, and they may be turned off.

Moreover, when the electrical energy L_ea for the first lamp is current, the brightness of the plurality of first lamps 11 may become different according to the intensity (or amount) of the current.

The plurality of second lamps 12 may be lamps that emit near-infrared rays, and generally may include near-infrared ray (NIR) lamps.

The plurality of second lamps 12 may be supplied with electrical energy L_eb for the second lamp and may be turned on.

Then, when the plurality of second lamps 12 are not supplied with the electrical energy L_eb for the second lamp, and they may be turned off.

As illustrated in FIG. 1, the plurality of first lamps and the plurality of second lamps 12 may be disposed alternately at a location, at which the camera 20 is installed.

The camera 20 may acquire an image of a periphery of the vehicle and output image information C_i.

The image recognizer 30 may recognize the image information C_i provided by the camera 20, and may provide driving information that is necessary for autonomous driving or ADAS driving.

For example, the image recognizer 30 may determine whether the vehicle is currently in daytime driving or nighttime driving based on the image information C_i, how a state of a road, on which the vehicle currently travels, is, and what objects are around the vehicle.

In more detail, the image recognizer 30 included in the integrated module including the camera and the lamp of the vehicle according to the embodiment of the present disclosure may determine whether the vehicle is currently in daytime driving or nighttime driving based on the image information C_i, and output the determination result as daytime/nighttime determination information DN.

The lamp controller 40 may generate electrical energy L_ea and L_eb for the first and second lamps, based on the daytime/nighttime determination information DN provided by the image recognizer 30.

Then, the electrical energy L_ea for the first lamp generated by the lamp controller 40 may be provided to the plurality of first lamps 11, and the electrical energy L_eb for the second lamp may be provided to the plurality of second lamps 12.

For example, based on the daytime/nighttime determination information DN that indicates that the vehicle has to be in daytime driving, the lamp controller 40 may provide a first preset amount of the electrical energy L_ea for the first lamp to the plurality of first lamps 11, and may stop providing the electrical energy L_eb for the second lamp to the plurality of second lamps 12.

Furthermore, based on the daytime/nighttime determination information DN that indicates that the vehicle has to be in nighttime driving, the lamp controller 40 may provide a second preset amount of the electrical energy L_ea for the first lamp to the plurality of first lamps 12, and may stop providing the electrical energy L_eb for the second lamp to the plurality of second lamps 12.

Then, the first preset amount of the electrical energy L_ea for the first lamp may be smaller than the second preset amount of the electrical energy L_ea for the first lamp.

Furthermore, although it is disclosed that the integrated module including the camera and the lamp of the vehicle according to the embodiment of the present disclosure, as illustrated in FIG. 1, includes the image recognizer 30, the image recognizer 30 may not be included in the integrated module including the camera and the lamp, but may be connected to the camera 20 and the lamp controller 40 through a wired/wireless network (for example, a CAN network) for the vehicle.

That is, the integrated module including the camera and the lamp according to the embodiment of the present disclosure may include the plurality of first lamps 11, the plurality of second lamps 12, the camera 20, and the lamp controller 40.

Figure 2:
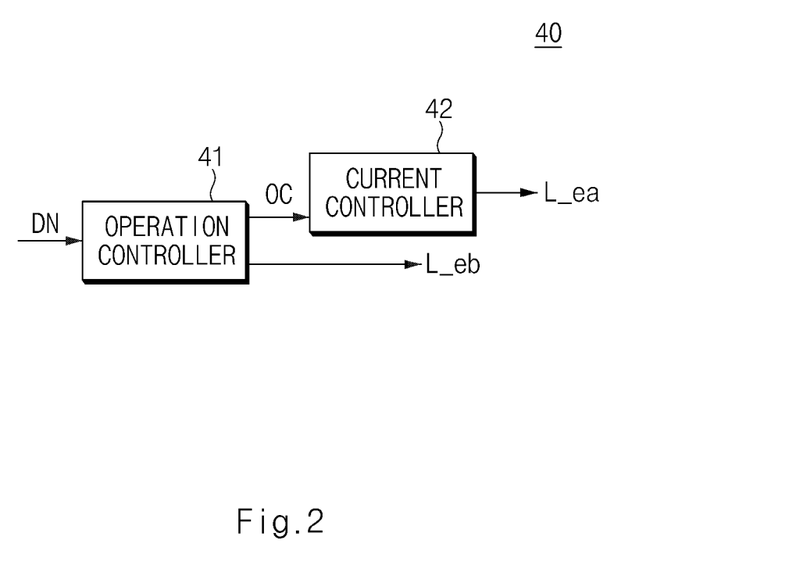
FIG. 2 is a view illustrating a configuration of a lamp controller of an integrated module including a camera and a lamp of a vehicle according to an embodiment of the present disclosure.

FIG. 2 is a view illustrating a configuration of a lamp controller of an integrated module including a camera and a lamp of a vehicle according to an embodiment of the present disclosure.

Referring to FIG. 2, the lamp controller 40 may generate the electrical energy L_ea and L_eb for the first and second lamps based on the daytime/nighttime determination information DN, and the lamp controller 40 may include an operation controller 41 and a current controller 42.

The operation controller 41 may generate an operation signal OC and the electrical energy L_eb for the second lamp based on the daytime/nighttime determination information DN.

For example, the operation controller 41 may receive the daytime/nighttime determination information DN including information that indicates that the host vehicle has to be in daytime driving, enable the operation signal OC, and stop providing the electrical energy L_eb for the second lamp to the plurality of second lamps 12.

For example, the operation controller 41 may receive the daytime/nighttime determination information DN including information that indicates that the host vehicle has to be in nighttime driving, disenable the operation signal OC, and provide the electrical energy L_eb for the second lamp to the plurality of second lamps 12.

The current controller 42 may control the amount of electrical energy included in the electrical energy L_ea for the first lamp based on the operation signal OC. Then, the electrical energy controlled by the current controller 42 based on the operation signal OC may be current.

For example, the current controller 42 may provide the electrical energy L_ea for the first lamp including a larger amount of currents to the plurality of first lamps 11 when the operation signal OC is enabled than when the operation signal OC is disenabled.

In more detail, the current controller 42 may provide the first preset amount of the electrical energy L_ea for the first lamp to the plurality of first lamps 11 when the operation signal OC is enabled, and may provide the second preset amount of the electrical energy L_ea for the first lamp to the plurality of first lamps 11 when the operation signal OC is disenabled. Then, the first preset amount of the electrical energy L_ea for the first lamp may include currents that are smaller than the currents of the second preset amount of the electrical energy L_ea for the first lamp.

FIGS. 3A, 3B, 4A and 4B are views illustrating an embodiment of an integrated module including a camera and a lamp of a vehicle according to an embodiment of the present disclosure.

Figure 3A:
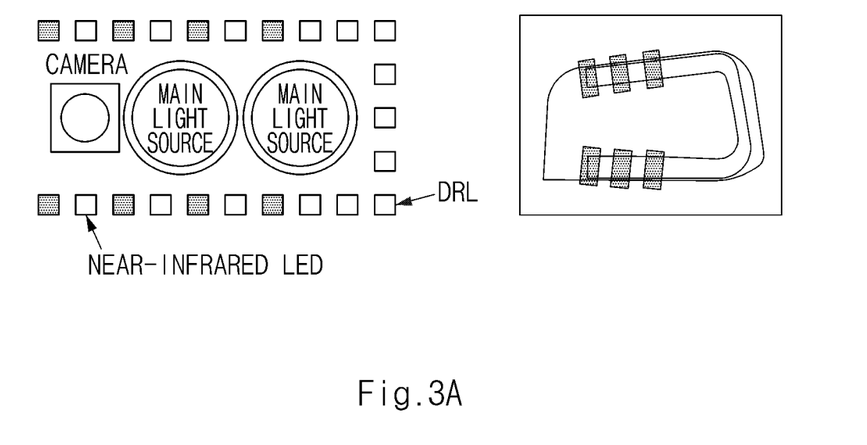
FIGS. 3A, 3B, 4A and 4B are views illustrating an embodiment of an integrated module including a camera and a lamp of a vehicle according to an embodiment of the present disclosure.
Figure 3B:
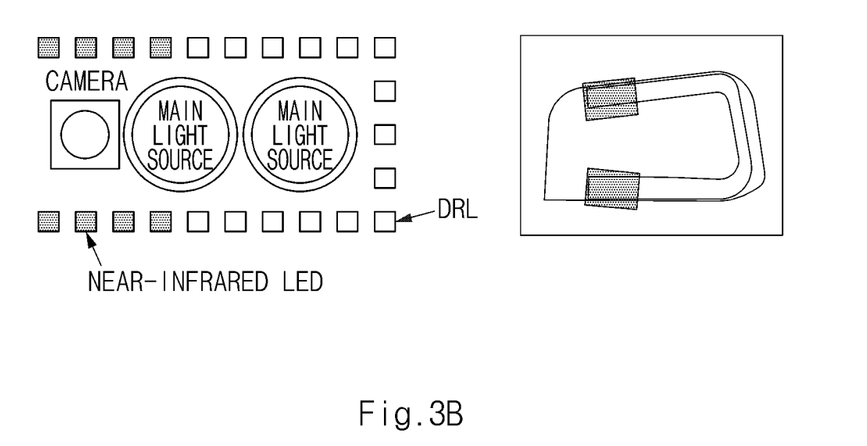

FIGS. 3A and 3B illustrate that the integrated module including the camera and the lamp of the vehicle according to the embodiment of the present disclosure is disposed on a front side of the vehicle.

Then, the integrated module including the camera and the lamp of the vehicle according to the embodiment of the present disclosure may be disposed at a location, at which a headlight on the front side of the vehicle is disposed.

As illustrated in FIG. 3A, the camera 20 may be disposed close to the location, at which the headlight that is a main light source of the vehicle is disposed, and the plurality of first lamps 11 may be disposed to surround the headlight and the camera 20.

Then, the plurality of second lamps 12 may be disposed on the upper side or lower side, or the upper and lower sides of the site, at which the camera 20 is located, and the first lamps 11 and the second lamps 12 may be alternately disposed.

As illustrated in FIG. 3B, the camera 20 may be disposed close to the location, at which the headlight that is a main light source of the vehicle is disposed, and the plurality of first lamps 11 and the plurality of second lamps 12 may be disposed to surround the headlight and the camera 20.

Then, the plurality of second lamps 12 may be continuously disposed on the upper side or lower side, or the upper and lower sides of the site, at which the camera 20 is located, and the plurality of first lamps 11 may be disposed at the other locations.

The first lamps 11 may be daytime running lamps (DRLs), and the second lamps 12 may be near-infrared ray (NIR) lamps.

Figure 4A:
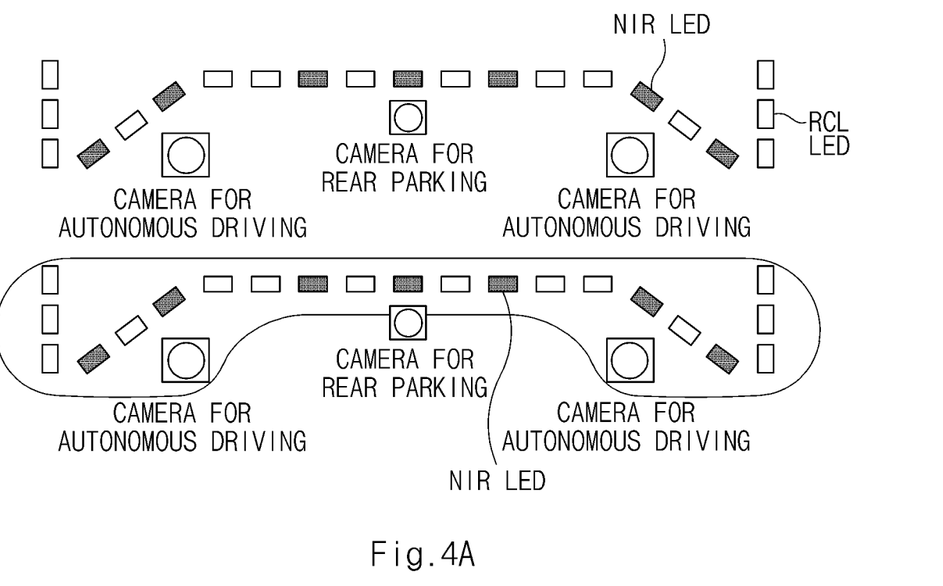
Figure 4B:
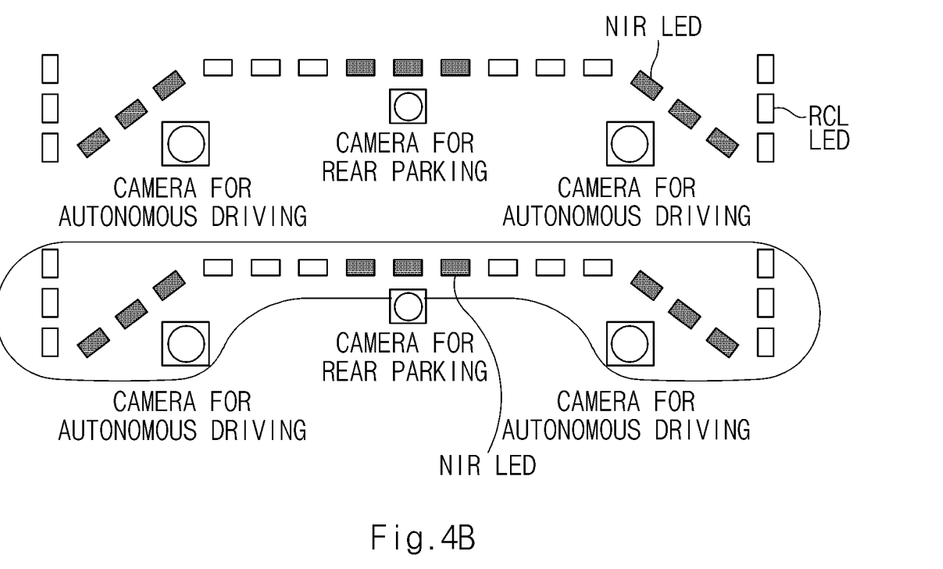

FIGS. 4A and 4B illustrate that the integrated module including the camera and the lamp of the vehicle according to the embodiment of the present disclosure is disposed on a rear side of the vehicle.

Then, the integrated module including the camera and the lamp of the vehicle according to the embodiment of the present disclosure may be disposed at a location, at which the RCLs of on the rear side of the vehicle are disposed. Then, the RCLs may be the plurality of first lamps 11 (RCL LEDs).

As in FIG. 4A, the camera 20 (a camera for rear parking or a camera for autonomous driving) may be disposed on the lower side of the location, at which the RCLs on the rear side of the vehicle are disposed, and the plurality of second lamps 12 may be disposed on the upper side of the location, at which the camera for rear parking and the camera for autonomous driving alternately with the RCLs.

As in FIG. 4B, the camera 20 (a camera for rear parking or a camera for autonomous driving) may be disposed on the lower side of the location, at which the RCLs on the rear side of the vehicle are disposed, and the plurality of second lamps 12 may be continuously disposed on the upper side of the location, at which the camera for rear parking and the camera for autonomous driving.

Then, the first lamps 11 may be RCL LEDs, and the second lamps 12 may be near-infrared ray (NIR) lamps (NIR LEDs).

Figure 5:
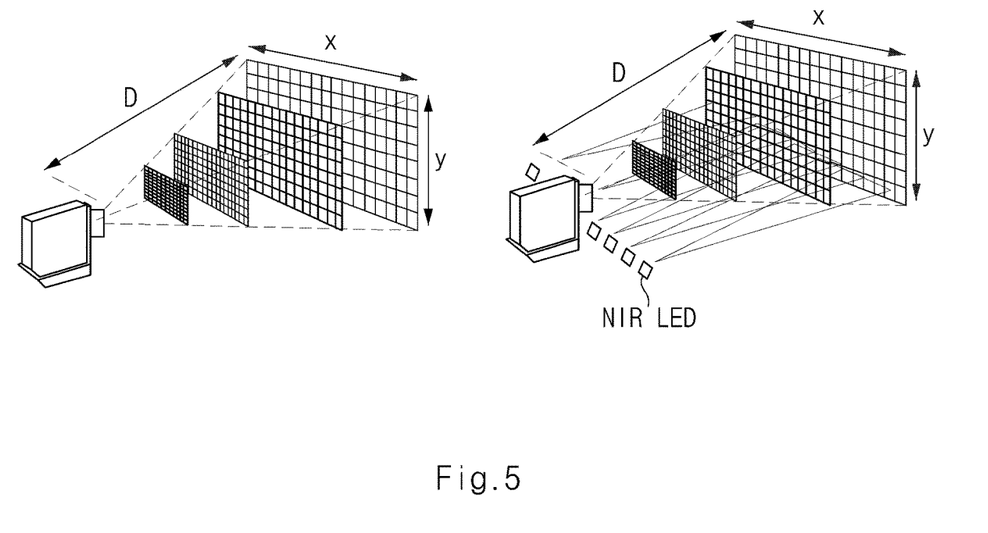
FIG. 5 is a view illustrating an integrated module including a camera and a lamp of a vehicle according to an embodiment of the present disclosure.

The reason why the near-infrared ray LEDs, that is, the NIR LEDs are alternately or continuously disposed in the direction of the transverse axis (X axis) on the upper side or the lower side, or the upper and lower sides is that the angle of view for the X axis of the camera 20 is wider than the angle of view for the X axis of the NIR LEDs as illustrated in FIG. 5.

The above-configured integrated module including the camera and the lamp of the vehicle according to the embodiment of the present disclosure may determine whether the vehicle is in daytime driving or in nighttime driving, from the image acquired by the camera, and may supply a smaller amount of current to the first lamps (for example, the DRLs and the RCLs) during the daytime driving than during the nighttime driving, thereby reducing consumption of electrical energy by making the lamps darker than during the nighttime driving.

Furthermore, the integrated module including the camera and the lamp of the vehicle according to the embodiment of the present disclosure may determine whether the vehicle is in daytime driving or in nighttime driving, from the image acquired by the camera, and may supply a larger amount of current to the first lamps (for example, the DRLs and the RCLs) during the nighttime driving than during the daytime driving, thereby securing the safety of the host vehicle by making the lamps brighter than during the daytime driving.

Furthermore, according to the integrated module including the camera and the lamp according to the embodiment of the present disclosure, the reliability of the image acquired by the camera during the nighttime driving may be increased by disposing the camera at the location, at which the first and second lamps are disposed, and the nighttime image recognition rate of the camera may be improved by disposing the second lamps that are near-infrared ray LED lamps such that the second lamps are close the location, at which the camera is located.

The present technology has an advantage of improving the quality of a nighttime image of a camera.

The present technology may prevent dazzling of a pedestrian and a driver of a counterpart vehicle by operating a near-infrared ray lamp during nighttime driving of a vehicle.

In addition, the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:
1. A system comprising:
   a camera configured to acquire an image of a periphery of a vehicle and provide the image;
   at least one first lamp and at least one second lamp disposed at at least one location of an upper side and a lower side of the camera in a direction of a transverse axis of the camera; and a lamp controller configured to provide, to the at least one first lamp, first electrical energy for the at least one first lamp, and provide, to the at least one second lamp, second electrical energy for the at least one second lamp according to daytime/nighttime determination information determined based on the image, wherein the lamp controller includes:
an operation controller configured to generate an operation signal and the second electrical energy for the at least one second lamp based on the daytime/nighttime determination information; and
a current controller configured to control an amount of current of the first electrical energy for the at least one first lamp based on the operation signal, and wherein the operation controller is configured to:
enable the operation signal and stop providing, to the at least one second lamp, the second electrical energy for the at least one second lamp when the daytime/nighttime determination information indicates that current driving of the vehicle is daytime driving; and
disenable the operation signal and provide, to the at least one second lamp, the second electrical energy for the at least one second lamp when the daytime/nighttime determination information indicates that current driving of the vehicle is nighttime driving.

2. The system of claim 1, wherein:
the at least one first lamp includes at least one of a daytime running lamp disposed on a front side of the vehicle and a rear combination lamp disposed on a rear side of the vehicle, and
the at least one second lamp includes a near-infrared ray LED lamp.

3. The system of claim 2, wherein the at least one second lamp is continuously disposed at the at least one location of the upper side and the lower side of the camera in the direction of the transverse axis of the camera, or disposed alternately with the at least one first lamp at the at least one location of the upper side and the lower side of the camera in the direction of the transverse axis of the camera.

4. The system of claim 1, further comprising an image recognizer configured to:
receive the image from the camera;
determine, based on the received image, whether current driving of the vehicle is daytime driving or nighttime driving; and
provide a result of the determined current driving of the vehicle as the daytime/nighttime determination information.

5. The system of claim 4, wherein the lamp controller is configured to:
provide, to the at least one first lamp, a first amount of the first electrical energy for the at least one first lamp when the determined current driving of the vehicle is the daytime driving;
provide, to the at least one first lamp, a second amount of the first electrical energy for the at least one first lamp when the determined current driving of the vehicle is the nighttime driving, the first amount being smaller than the second amount; and
stop providing, to the at least one second lamp, the second electrical energy for the at least one second lamp when the determined current driving of the vehicle is the daytime driving.

6. The system of claim 1, wherein the current controller is further configured to:
cause the first electrical energy for the at least one first lamp to have a first amount of current when the operation signal is enabled; and
cause the first electrical energy for the at least one first lamp to have a second amount of current when the operation signal is disenabled, the first amount being smaller than the second amount.

7. The system of claim 1, wherein the system is an integrated module.

8. A system comprising:
a camera configured to acquire an image of a periphery of a vehicle and provide the image;
at least one first lamp and at least one second lamp disposed at at least one location of an upper side and a lower side of the camera in a direction of a transverse axis of the camera; and
a lamp controller configured to provide, to the at least one first lamp, first electrical energy for the at least one first lamp, and provide, to the at least one second lamp, second electrical energy for the at least one second lamp according to daytime/nighttime determination information determined based on the image,
the system further comprises an image recognizer configured to:
receive the image from the camera;
determine, based on the received image, whether current driving of the vehicle is daytime driving or nighttime driving; and
provide a result of the determined current driving of the vehicle as the daytime/nighttime determination information,
wherein the lamp controller is configured to:
provide, to the at least one first lamp, a first amount of the first electrical energy for the at least one first lamp when the determined current driving of the vehicle is the daytime driving;
provide, to the at least one first lamp, a second amount of the first electrical energy for the at least one first lamp when the determined current driving of the vehicle is the nighttime driving, the first amount being smaller than the second amount; and
stop providing, to the at least one second lamp, the second electrical energy for the at least one second lamp when the determined current driving of the vehicle is the daytime driving, and
wherein the lamp controller is further configured to:
provide, to the at least one first lamp, a third amount of the first electrical energy for the at least one first lamp when the determined current driving of the vehicle is the nighttime driving;
provide, to the at least one first lamp, a fourth amount of the first electrical energy for the at least one first lamp when the determined current driving of the vehicle is the daytime driving, the third amount being greater than the fourth amount; and
provide, to the at least one second lamp, the second electrical energy for the at least one second lamp when the determined current driving of the vehicle is the nighttime driving.

9. A system comprising:
a camera configured to acquire an image of a periphery of a vehicle and provide the image;
a plurality of daytime running lamps disposed adjacent to the camera;

a plurality of near-infrared ray lamps disposed adjacent to the camera, wherein the daytime running lamps and the near-infrared ray lamps are disposed in a direction of a transverse axis of the camera;

an image recognizer configured to determine whether current driving of the vehicle is daytime driving or nighttime driving based on the image, and output a result of the determined current driving of the vehicle as daytime/nighttime determination information; and a lamp controller configured, based on the daytime/nighttime determination information, to supply or stop supplying first electrical energy to the daytime running lamp and to supply or stop supplying second electrical energy to the near-infrared ray lamps based on the daytime/nighttime determination information, wherein the lamp controller includes:

an operation controller configured to generate an operation signal and the second electrical energy for the near-infrared ray lamps based on the daytime/nighttime determination information; and a current controller configured to control, based on the operation signal, an amount of current of the first electrical energy for the daytime running lamps, and wherein the operation controller is configured to:

enable the operation signal and stop providing, to the near-infrared ray lamps, the second electrical energy when the daytime/nighttime determination information indicates that current driving of the vehicle is daytime driving; and disenable the operation signal and provide, to the near-infrared ray lamps, the second electrical energy when the daytime/nighttime determination information indicates that current driving of the vehicle is nighttime driving.

10. The system of claim 9, wherein the system is an integrated module.

* * * * *